United States Patent [19]

Hendrick

[11] Patent Number: 4,585,025
[45] Date of Patent: Apr. 29, 1986

[54] MOUNTING FOR A VALVE ACTUATOR

[75] Inventor: Fred W. Hendrick, Long Beach, Calif.

[73] Assignee: Smith International, Inc., Newport Beach, Calif.

[21] Appl. No.: 754,239

[22] Filed: Jul. 12, 1985

[51] Int. Cl.⁴ .............................................. F16K 43/00
[52] U.S. Cl. .................................. 137/315; 251/249.5; 251/291
[58] Field of Search ............. 137/315; 251/248, 249.5, 251/291, 292

[56] References Cited

U.S. PATENT DOCUMENTS

| 3,026,741 | 3/1962 | Schaverien | 251/249.5 |
| 3,034,371 | 5/1962 | Cantalupo et al. | 251/291 |
| 3,776,507 | 12/1973 | Tomlin et al. | 137/315 |
| 4,231,389 | 11/1980 | Still et al. | 137/315 |
| 4,442,892 | 4/1984 | Delesandri | 137/315 |

Primary Examiner—G. L. Walton
Attorney, Agent, or Firm—Christie, Parker & Hale

[57] ABSTRACT

An actuator is mounted on a valve body by a threaded nut. A ring gear on the nut is engaged by a manually operated spur gear for threading the nut on or off the valve body with a mechanical advantage.

5 Claims, 3 Drawing Figures

MOUNTING FOR A VALVE ACTUATOR

BACKGROUND

This invention relates to apparatus for mounting the actuator and trim on a valve and is particularly suitable for undersea applications.

It is often desirable in the production of oil and gas from subsea wells to provide flow control valves at the wellhead at the sea floor. Such valves are usually operated, maintained or repaired manually or with submersible vehicles that have limited capability.

For example, in one embodiment a four inch cage and plug type valve body is mounted in piping at a subsea wellhead. The "trim" or operating mechanism within the valve body is replaceable so that leakage or wear problems can be rectified. A valve actuator or operator is commonly connected to the trim so that the valve can either be operated from a remote location or it can be operated manually with relatively little effort. In such an arrangement the valve trim and actuator are ordinarily removable from the valve as a unit for return to the tender or platform for maintenance. In an exemplary embodiment the dry weight of the trim and actuator is about 335 kilograms. This heavy assembly must be secured to the valve body by divers or submersibles.

Previous arrangements for making this connection have not been entirely satisfactory. The actuator and trim may be connected to the valve body by flanges which requires the assembly and tightening of a large number of bolts. The bolts must be removed when the valve is disassembled for maintenance. In another arrangement the valve body is threaded and a "hammer nut" is used to secure the trim in the valve body. As suggested by its name, the nut is tightened or loosened by hammering.

There are clear shortcomings to either of these approaches and it is therefore desirable to provide a means for reliably and easily connecting the trim and actuator to a subsea valve. It is desirable that this be simple so that a single diver can perform the operation quickly and with minimum effort.

BRIEF SUMMARY OF THE INVENTION

There is, therefore, provided in practice of this invention a valve and actuator assembly comprising a valve body having a threaded open end in which the valve operating trim is inserted. An actuator is connected to the trim for adjusting the valve for controlling flow through the valve. A nut captured between the actuator and trim, and free to rotate relative thereto, connects to the threaded open end of the valve body. A ring gear secured to the nut is driven by a spur gear on a shaft mounted on the actuator. Such a shaft can be readily rotated manually to provide a substantial mechanical advantage for threading the nut onto the valve body.

DRAWINGS

These and other features and advantages of the present invention will be appreciated as the same becomes better understood by reference to the following detailed description when considered in connection with the accompanying drawings wherein.

DESCRIPTION

In the illustrated embodiment only a fragment of the open end of the body 10 of a conventional valve is shown. In an exemplary embodiment the valve is a plug and cage valve and since the internal structure of the valve is unimportant for understanding, only the end of the cage 11 of the valve trim is illustrated. Typically, the balance of the valve body is a roughly cylindrical casting having fittings on each side for connection in a piping system. The details of the valve body are unimportant for an understanding of this invention.

Figure 1:
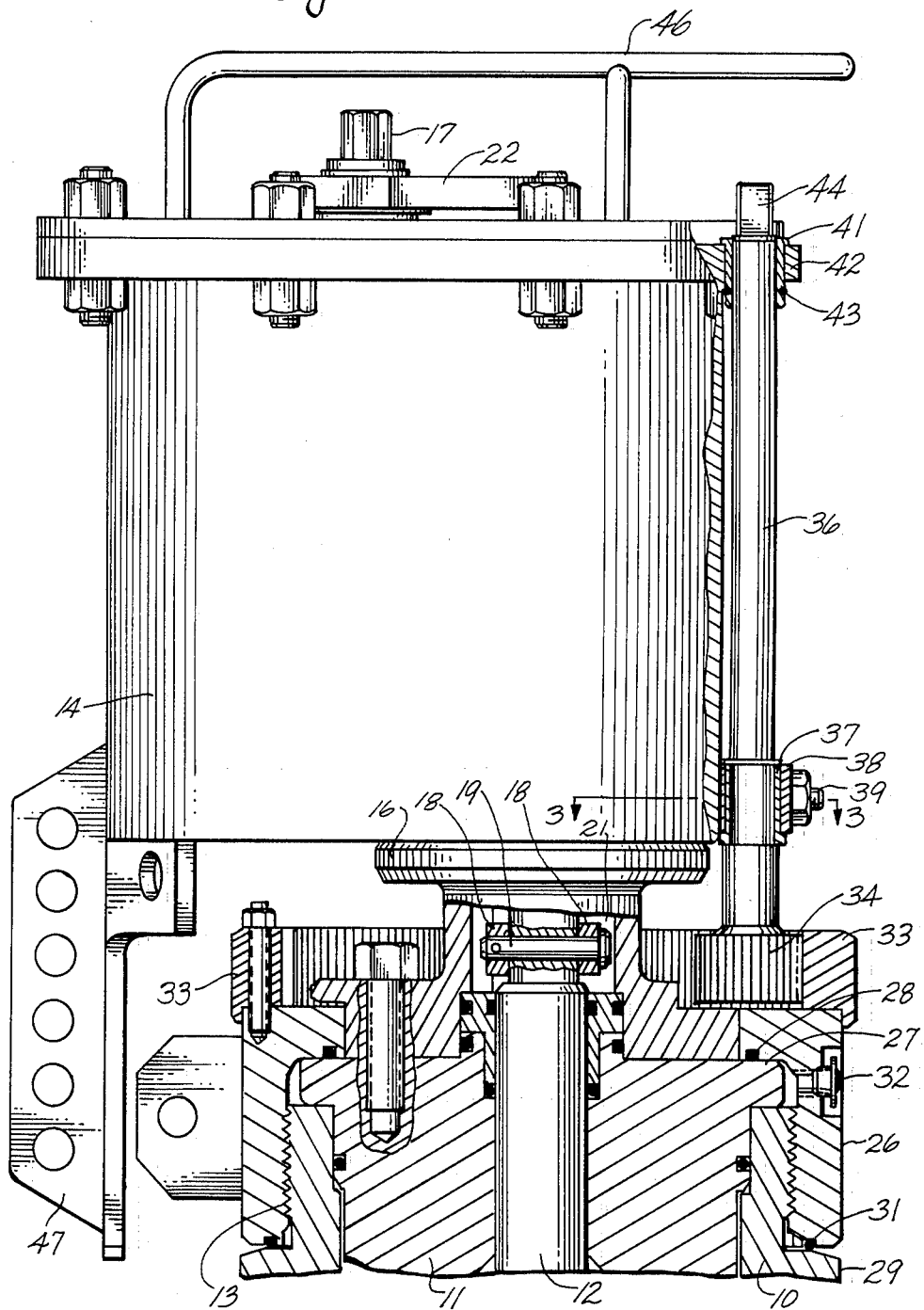
FIG. 1 illustrates in side view and partial longitudinal cross section a valve and actuator assembly constructed according to principles of this invention.
Figure 2:
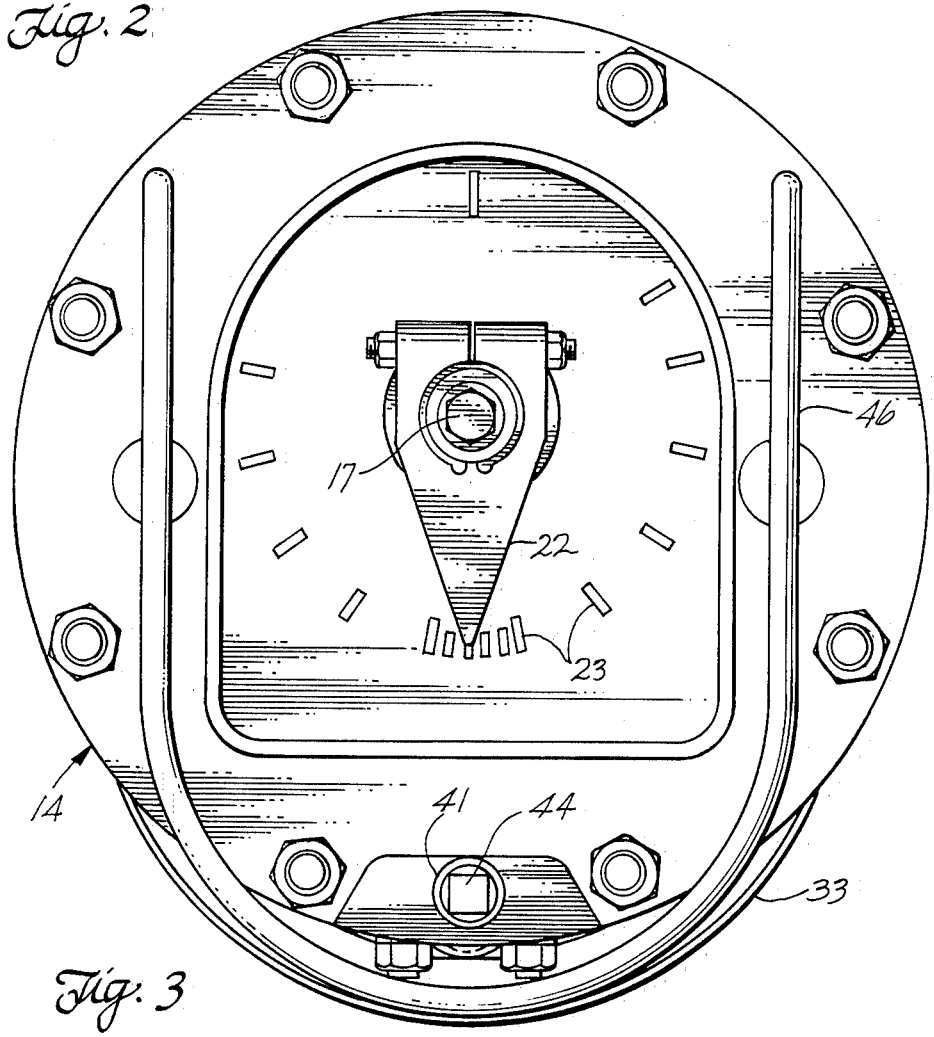
FIG. 2 is a top view of the actuator and valve assembly.
Figure 3:
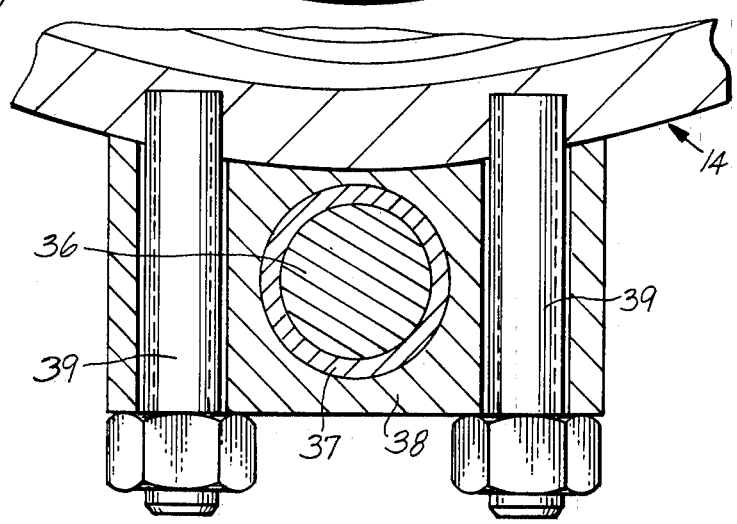
FIG. 3 is a fragmentary cross section at line 3—3 of FIG. 1.

The end of the shaft 12 of the plug is also shown in FIG. 1. In the jargon of the art the plug and cage are referred to as the "valve trim". Although this particular embodiment happens to be a plug and cage valve, the trim could be for a needle valve or a multiple orifice valve, for example. The feature of the valve of significance in practice of this invention is that there are threads 13 at the open end of the valve body.

A valve actuator assembly 14 is bolted to the end of the valve cage 11 by a spool piece 16 which is rigidly connected to the case for the actuator. In the drawings only the exterior of the actuator case is illustrated since the conventional internal gearing and the like for operating the valve trim is not material to practice of this invention. In the illustrated embodiment the actuator is driven by a crank operated shaft 17 at the far end from the valve. Internal gearing within the actuator causes the shaft 12 of the plug to shift longitudinally in response to rotation of the actuator shaft 17. The plug shaft is kept from rotating by keys 18 secured to the plug shaft by a dowel 19 for sliding in slots 21 in the spool piece. The internal gearing also operates a pointer 22 adjacent indicia 23 on the cover of the actuator assembly. A different actuator might be used for a needle valve or multiple orifice valve.

A bonnet nut 26 is threaded onto the threads 13 at the open end of the valve body. The nut is captive between the end of the cage 11 and the spool piece 16, but is free to rotate relative to the trim and spool piece. When secured on the valve body the nut tightly engages a shoulder 27 at the end of the cage. This secures the cage tightly in its proper position in the valve body. The nut is sealed against the shoulder by an O-ring 28. The nut is also sealed against, but does not tightly engage, a shoulder 29 on the valve body by an O-ring 31. A grease fitting and plug 32 is provided on the nut so that grease can be squeezed into the space between the nut and cage and into the threads between the nut and valve body. Trapped seawater and grease can extrude past the seal ring 31 adjacent the valve body shoulder 29. The grease inhibits corrosion in the threads that might make it difficult to disassemble the valve.

An internal ring gear 33 is securely bolted to the bonnet nut. A smaller spur gear 34 engages the teeth of the ring gear. The spur gear is mounted on the end of a drive shaft 36 mounted on the side of the housing of the actuator 14. One end of the shaft is supported in a bearing bushing 37 held in place by a pillow block 38 fastened to the actuator housing by bolts 39. Nearer its other end the gear shaft is supported by a bearing bushing 41 held in a hole in the flange 42 of the actuator housing by a snap ring 43. The end of the shaft has a square lug 44 for receiving a wrench. A smaller driving gear and larger driven gear are used to give a mechanical advantage for tightening the bonnet nut or loosening a stubborn nut if it should be too tight.

To disassemble the valve, the gear shaft 36 is rotated by a ratchet wrench or the like. The resultant rotation of the spur gear 34 drives the ring gear 33, thereby rotating the bonnet nut 26. This causes the nut to disengage from the valve body. A guide (not shown) on the actuator engages a guide on the valve body to prevent the actuator from rotating relative to the body so that as the shaft is rotated, only the bonnet nut rotates. Since the nut is between the spool piece 16 and cage 11, this also gradually withdraws the trim from the valve body. By the time the nut is completely disengaged from the threads on the body the trim is pulled out to the extent that it can freely be removed from the body. The actuator and trim assembly can be pulled from the body by a handle 46 and if desired the weight can be supported by a cable on a side bracket 47.

To reassemble the valve is essentially the reverse of the disassembly. The trim is inserted in the valve body until the bonnet nut reaches a location where it can engage the threads on the valve body. The gear shaft 36 is then rotated to engage the threads and draw the valve trim tightly into the valve body. A torque wrench can be used to provide the proper degree of tightening to assure a good seal without compromising ease of disassembly. It will be noted that the nut secured between the cage and spool piece also serves to approximately center the trim in the body.

Although one embodiment of valve and actuator assembly has been described and illustrated herein, various modifications and variations will be apparent to one skilled in the art. For example, if desired, the gear shaft 36 can be motorized or driven by a motorized wrench. A number of ways of mounting such a shaft on the actuator will also be apparent. If one desires a larger mechanical advantage than obtained by the large ring gear and small gear, an additional gear reduction can be provided between the shaft and nut.

In the preferred embodiment, the valve body has an external thread and the nut fits over it. It will be apparent that a valve body with an internal thread can be used with the nut fitting partly into the valve body. One may also use a large spur gear on the nut and a smaller spur gear on the shaft for driving the nut. In another arrangement, bevel or spiral gears can be used on the bonnet nut and to drive the bonnet nut so that the gear axes do not need to be parallel. The illustrated arrangement is preferred since the gears are relatively shielded and non-hazardous to a diver and the valve operator 17 and nut driving shafts are both at the end of the valve so that there is less concern about working clearance.

Many other details can be modified as desired. It is therefore to be understood that within the scope of the appended claims, the invention may be practiced otherwise than as specifically described.

What is claimed is:

1. Apparatus for mounting an actuator on a valve body comprising:
   a valve body having a threaded open end;
   valve operating trim insertable into the valve body;
   a valve actuator connected to the valve operating trim;
   a nut connected to the actuator and free to rotate relative to the actuator while mating with the threaded open end on the valve body;
   a first larger gear secured on the nut;
   a second smaller gear for driving the first gear with a mechanical advantage; and
   means for driving the second gear for rotating the nut relative to the valve body for directly assemblying the actuator and the nut to the valve body.

2. Apparatus as recited in claim 1 wherein the first gear is a ring gear secured to the nut and the second gear is a spur gear in the ring gear.

3. Apparatus as recited in claim 2 wherein the means for driving comprises:
   a shaft on the spur gear;
   bearing means for mounting the shaft on the actuator; and
   means for rotating the shaft.

4. Apparatus as recited in claim 1 wherein the valve body has an external thread and the nut has an internal thread.

5. A valve and actuator assembly comprising:
   a valve body having a threaded open end;
   valve operating trim in the valve body for controlling flow;
   an actuator connected to the trim for operating the trim;
   a nut on the threaded open end of the valve body, the nut being between the actuator and the trim and free to rotate relative to the actuator;
   a ring gear secured to the nut;
   a spur gear engaging the ring gear;
   a shaft mounted on the actuator connected to the spur gear; and
   means for rotating the shaft for causing the nut to rotate relative to the actuator and valve body for directly assemblying the actuator and the nut to the valve body.

* * * * *